US012617276B2

(12) United States Patent
Fujiwara

(10) Patent No.: US 12,617,276 B2
(45) Date of Patent: May 5, 2026

(54) CONTROL DEVICE AND MOVING BODY

(71) Applicant: HONDA MOTOR CO., LTD., Tokyo (JP)

(72) Inventor: Tatsuro Fujiwara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 18/374,384

(22) Filed: Sep. 28, 2023

(65) Prior Publication Data

US 2024/0109415 A1 Apr. 4, 2024

(30) Foreign Application Priority Data

Sep. 30, 2022 (JP) ................................. 2022-157935

(51) Int. Cl.
 *B60K 35/22* (2024.01)
 *B60W 50/14* (2020.01)
 *B60K 35/10* (2024.01)
 *B60K 35/81* (2024.01)
(52) U.S. Cl.
 CPC ............. *B60K 35/22* (2024.01); *B60W 50/14* (2013.01); *B60K 35/10* (2024.01); *B60K 35/81* (2024.01);
 (Continued)
(58) Field of Classification Search
 CPC .... B60K 2360/1434; B60K 2360/1438; B60K 2360/1468; B60K 2360/171;
 (Continued)

(56) References Cited

U.S. PATENT DOCUMENTS

2014/0152774 A1* 6/2014 Wakabayashi ............ G06T 3/00
 348/46
2019/0001968 A1 1/2019 Yorifuji et al.
 (Continued)

FOREIGN PATENT DOCUMENTS

JP 2013-074423 A 4/2013
JP 2014-193661 A 10/2014
 (Continued)

OTHER PUBLICATIONS

Aug. 6, 2024, Translation of Japanese Office Action issued for related JP Application No. 2022-157935.
 (Continued)

*Primary Examiner* — Charles J Han
(74) *Attorney, Agent, or Firm* — Paratus Law Group, PLLC

(57) ABSTRACT

A control device for controlling a display device is mounted on a moving body that moves to a target position specified by a user by automatic steering. The moving body is configured to be capable of perpendicular parking into the target position and parallel parking into the target position. When the perpendicular parking or the parallel parking is performed, the control device causes the display device to display a top view image of the moving body and surroundings, and to display a frame image indicating a place set as the target position superimposed on the top view image. The control device is capable of enlarging and displaying the top view image according to an instruction from the user. The control device makes a display range when the top view image is enlarged and displayed different between when the perpendicular parking is performed and when the parallel parking is performed.

12 Claims, 10 Drawing Sheets

(52) U.S. Cl.
CPC ................. *B60K 2360/1434* (2024.01); *B60K 2360/1468* (2024.01); *B60W 2050/146* (2013.01)

(58) Field of Classification Search
CPC .. B60K 2360/175; B60K 35/10; B60K 35/22; B60K 35/81; B60R 1/23; B60W 2050/146; B60W 30/06; B60W 50/14
See application file for complete search history.

(56) References Cited

U.S. PATENT DOCUMENTS

| | | | |
|---|---|---|---|
| 2019/0337455 A1 | 11/2019 | Kusayanagi et al. | |
| 2019/0344828 A1* | 11/2019 | Omori ................... | B60W 50/14 |
| 2020/0081608 A1 | 3/2020 | Yamamoto et al. | |
| 2020/0086793 A1 | 3/2020 | Watanabe et al. | |

FOREIGN PATENT DOCUMENTS

| | | |
|---|---|---|
| JP | 2018-203031 A | 12/2018 |
| JP | 2019-016825 A | 1/2019 |
| JP | 2019-196056 A | 11/2019 |
| JP | 2020-042417 A | 3/2020 |
| WO | WO 2017/179174 A1 | 10/2017 |

OTHER PUBLICATIONS

Apr. 16, 2024, Translation of Japanese Office Action issued for related JP Application No. 2022-157935.

* cited by examiner (FIG. 1 CONTINUED)
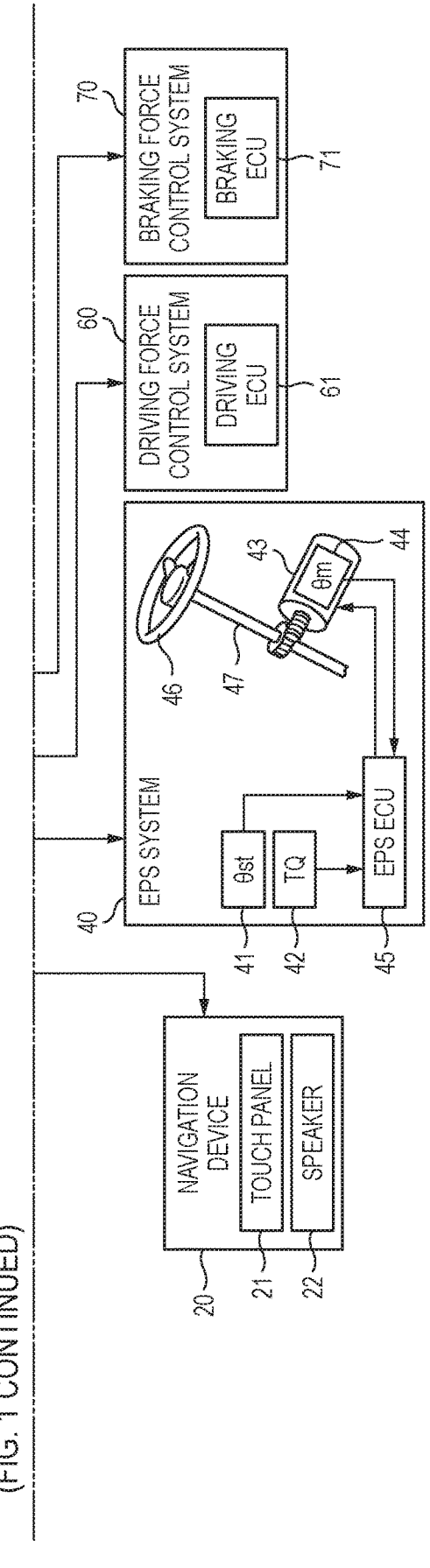

*FIG. 2*

PLEASE SELECT PARKING METHOD.

CONTROL DEVICE AND MOVING BODY

CROSS-REFERENCE RELATED ARTS

This application is based on and claims priority under 35 USC 119 from Japanese Patent Application No. 2022-157935 filed on Sep. 30, 2022, which is hereby incorporated by reference in its entirety.

TECHNICAL FIELD

The present disclosure relates to a control device and a moving body provided with the control device.

BACKGROUND ART

In recent years, efforts have been actively made to provide a sustainable transportation system in consideration of vulnerable traffic participants. As one of these efforts, research and development on driving assist techniques and automatic driving techniques for vehicles such as automobiles have been made in order to further improve safety and convenience of traffic.

For example, JP2014-193661A discloses a parking assistance device that presents a parking space setting frame superimposed on a top view image of a host vehicle, receives a first input specifying a first input point having a predetermined positional relation with the parking space setting frame and a second input specifying a second input point at a position different from the first input point, and adjusts a position of the parking space setting frame by changing the position of the parking space setting frame based on the first input point in accordance with a change in a relative position of the second input point with respect to the first input point.

SUMMARY

In the related art, there is room for improvement in effectively utilizing a limited display area of a display device to present necessary information to a user in an easy-to-understand manner.

An object of the present disclosure is to provide a control device capable of presenting necessary information to a user in an easy-to-understand manner by making effective use of a limited display area of a display device, and a moving body provided with the control device.

According to an aspect of the present disclosure, there is provided a control device for controlling a display device mounted on a moving body that moves to a target position specified by a user by automatic steering, in which the moving body is configured to be capable of perpendicular parking into the target position and parallel parking into the target position, when the perpendicular parking or the parallel parking is performed, the control device causes the display device to display a top view image of the moving body and surroundings of the moving body, and to display a frame image indicating a place set as the target position superimposed on the top view image, the control device is capable of enlarging and displaying the top view image according to an instruction from the user, and the control device makes a display range when the top view image is enlarged and displayed different between when the perpendicular parking is performed and when the parallel parking is performed.

According to another aspect of the present disclosure, there is provided a moving body including the above control device.

According to the present disclosure, a control device capable of presenting necessary information to a user in an easy-to-understand manner by making effective use of a limited display area of a display device, and a moving body provided with the control device may be provided.

BRIEF DESCRIPTION OF DRAWINGS

Exemplary embodiment(s) of the present invention will be described in detail based on the following figures, wherein:

FIG. 2 is a diagram (part 1) showing an example of an automatic parking-related screen displayed on a touch panel 21 by the control device 30 regarding automatic parking;

DESCRIPTION OF EMBODIMENTS

Figure 1:
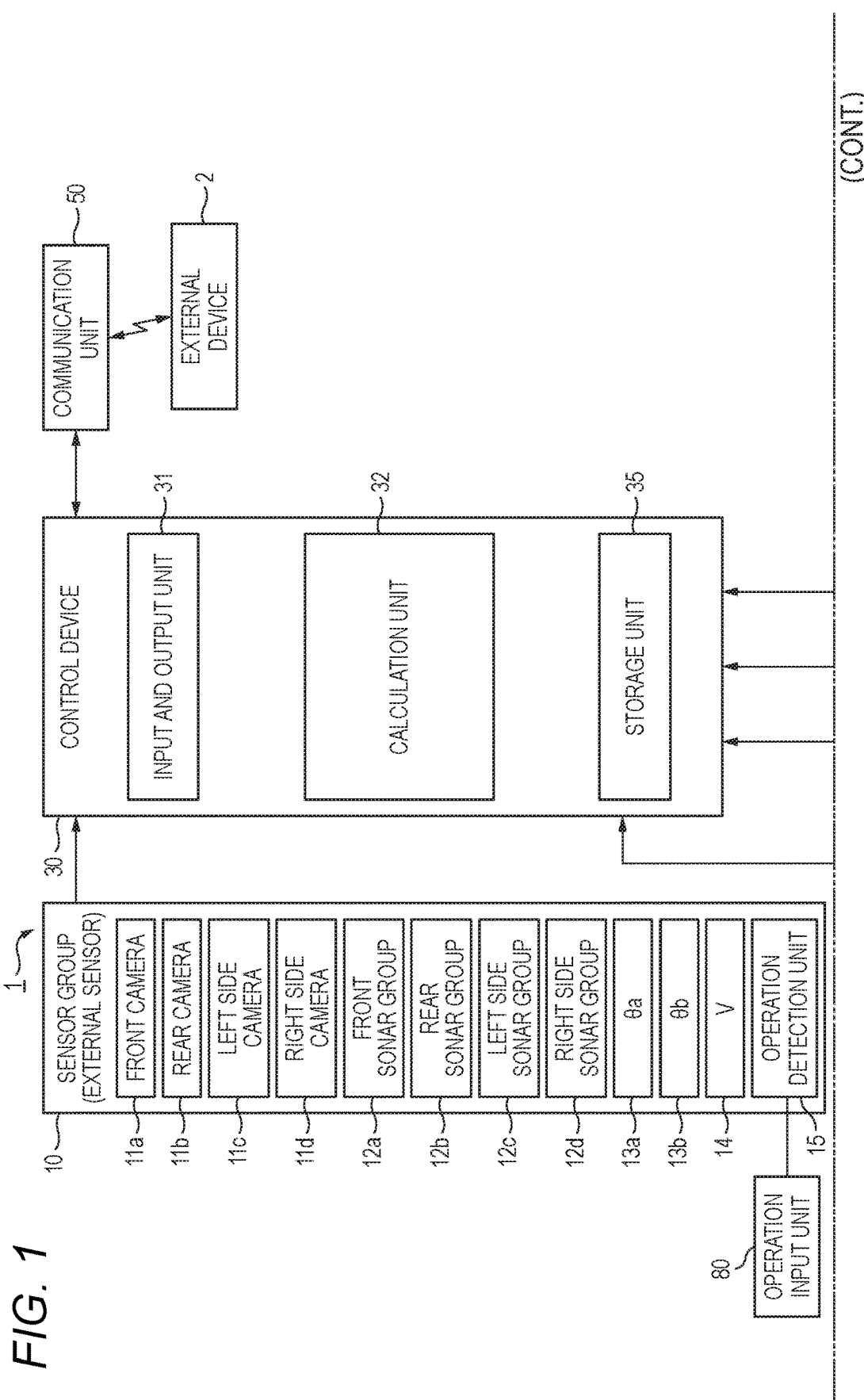
FIG. 1 is a diagram showing an example of a configuration of a vehicle 1 provided with a control device 30 according to one embodiment.

Hereinafter, an embodiment of a control device and a moving body according to the present disclosure will be described in detail with reference to the drawings. The embodiment described below is an example in which the moving body is a vehicle. In the present description and the like, in order to simplify and clarify the explanation, directions such as front, rear, left, right, up, and down are described according to directions viewed from an occupant of the vehicle (for example, a driver). Note that in the following, the same or similar elements are denoted by the same or similar reference numerals, and the description thereof may be omitted or simplified as appropriate.

(Vehicle)

A vehicle 1 according to the present embodiment shown in FIG. 1 is an automobile including a drive source, and wheels (all not shown) including drive wheels driven by power of the drive source and driven wheels that are steerable. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or the four wheels including the pair of left and right front wheels and the pair of left and right rear wheels. Either the front wheels or the rear wheels may be driven wheels that are steerable, or the front wheels and the rear wheels may both be driven wheels that are steerable.

The vehicle 1 is configured to be movable by automatic steering toward a target position specified by a user, who is an occupant of the vehicle 1. The vehicle 1 is configured to be movable to a target position while being prevented from entering an entry prohibition place set by the user, for example.

As the target position, a position at which the vehicle 1 is parked (hereinafter also simply referred to as a "parking position") may be set. That is, the vehicle 1 is capable of being parked by automatic steering at the parking position specified by the user. Hereinafter, parking by automatic steering to the parking position specified by the user is also referred to as "automatic parking".

The vehicle 1 is configured such that the user may select a parking method (in other words, a movement mode) to the parking position, which is the target position, during automatic parking. More specifically, in the present embodiment, a perpendicular parking pattern in which the vehicle 1 performs perpendicular parking and a parallel parking pattern in which the vehicle 1 performs parallel parking to the parking position, which is the target position, are prepared in advance. Furthermore, as the perpendicular parking pattern, a forward parking pattern in which the vehicle 1 performs forward parking and a backward parking pattern in which the vehicle 1 performs backward parking to the parking position, which is the target position, are prepared.

When the forward parking pattern is selected by the user, forward parking to the parking position, which is the target position, is performed. When the backward parking pattern is selected, backward parking to the parking position, which is the target position, is performed. When the parallel parking pattern is selected, parallel parking to the parking position, which is the target position, is performed.

An example of a configuration of the vehicle 1 is to be explained. As shown in FIG. 1, the vehicle 1 includes a sensor group 10, a navigation device 20, a control device 30, an electric power steering system (EPS system) 40, a communication unit 50, a driving force control system 60, and a braking force control system 70.

The sensor group 10 acquires various detection values related to the vehicle 1 or a surroundings of the vehicle 1.

The detection values obtained by the sensor group 10 are sent to the control device 30, which will be described later, and used for the automatic parking of the vehicle 1 and the like.

The sensor group 10 includes, for example, a front camera 11a, a rear camera 11b, a left side camera 11c, a right side camera 11d, a front sonar group 12a, a rear sonar group 12b, a left side sonar group 12c, and a right side sonar group 12d. These cameras and sonar groups may function as external sensors that acquire peripheral information of the vehicle 1.

The front camera 11a, the rear camera 11b, the left side camera 11c, and the right side camera 11d output, to the control device 30, image data of surrounding images obtained by capturing images of the surroundings of the vehicle 1. The surrounding images captured by the front camera 11a, the rear camera 11b, the left side camera 11c, and the right side camera 11d are also referred to as a front image, a rear image, a left side image, and a right side image, respectively. An image formed by the left side image and the right side image is also referred to as a side image.

The front sonar group 12a, the rear sonar group 12b, the left side sonar group 12c, and the right side sonar group 12d emit sound waves to the surroundings of the vehicle 1 and receive reflected sounds from other objects. The front sonar group 12a includes, for example, four sonars. The sonars constituting the front sonar group 12a are respectively provided on an obliquely left front side, a front left side, a front right side, and an obliquely right front side of the vehicle 1. The rear sonar group 12b includes, for example, four sonars. The sonars constituting the rear sonar group 12b are respectively provided on an obliquely left rear side, a rear left side, a rear right side, and an obliquely right rear side of the vehicle 1. The left side sonar group 12c includes, for example, two sonars. The sonars constituting the left side sonar group 12c are respectively provided in the front of a left side and in the rear of the left side of the vehicle 1. The right side sonar group 12d includes, for example, two sonars. The sonars constituting the right side sonar group 12d are respectively provided in the front of a right side and in the rear of the right side of the vehicle 1.

Furthermore, the sensor group 10 includes wheel sensors 13a and 13b, a vehicle speed sensor 14, and an operation detection unit 15. The wheel sensors 13a and 13b detect rotation angles $\theta a$ and $\theta b$ of the wheels (not shown), respectively. The wheel sensors 13a and 13b may be implemented by angle sensors or may be implemented by displacement sensors. The wheel sensors 13a and 13b output detection pulses each time the wheels rotate at a predetermined angle. The detection pulses output from the wheel sensors 13a and 13b may be used to calculate the rotation angles and rotation speeds of the wheels. A traveling distance of the vehicle 1 may be calculated based on the rotation angles of the wheels. The wheel sensor 13a detects, for example, the rotation angle $\theta a$ of the left rear wheel. The wheel sensor 13b detects, for example, the rotation angle $\theta b$ of the right rear wheel.

The vehicle speed sensor 14 detects a travel speed of a vehicle body (not shown) of the vehicle 1, that is, a vehicle speed V, and outputs the detected vehicle speed V to the control device 30. The vehicle speed sensor 14 detects the vehicle speed V based on, for example, rotation of a countershaft of a transmission.

The operation detection unit 15 detects a content of operation performed by the user using an operation input unit 80 and outputs the detected operation content to the control device 30. The operation input unit 80 may include, for example, an operation button or the like that receives an operation for executing the automatic parking. Note that the operation input unit 80 and a touch panel 21, which will be described later, may be made common.

The navigation device 20 detects a current position of the vehicle 1 by using, for example, a global positioning system (GPS), and guides the user to a path to a destination. The navigation device 20 includes a storage device (not shown) provided with a map information database.

The navigation device 20 includes a touch panel 21 and a speaker 22. The touch panel 21 functions as an input device that receives input of various types of information to the control device 30 and as a display device controlled by the control device 30. That is, the user may input various commands to the control device 30 via the touch panel 21. Various screens are displayed on the touch panel 21.

The speaker 22 outputs various kinds of guidance information by voice to the user. As an example, during automatic parking, voice guidance may be performed via the speaker 22. Specifically, when movement by automatic steering toward the parking position specified by the user is started, the start of the movement of the vehicle 1 may be notified by the voice guidance via the speaker 22.

The control device 30 is a device (computer) that controls the entire vehicle 1. The control device 30 includes, for example, an input and output unit 31, a calculation unit 32, and a storage unit 35. The input and output unit 31 is an interface that inputs and outputs data between inside and outside of the control device 30 under control of the calculation unit 32. The storage unit 35 includes a non-volatile storage medium, such as a flash memory, and stores various types of information (for example, data and programs) for controlling an operation of the vehicle 1.

The calculation unit 32 is implemented by, for example, a central processing unit (CPU) or the like, and controls each component of the vehicle 1 by executing the programs stored in the storage unit 35 or the like. Accordingly, the automatic parking is achieved. For example, the calculation unit 32 executes the automatic parking when receiving an operation for executing the automatic parking via the input and output unit 31 or the like.

For example, the calculation unit 32 controls a display device (here, the touch panel 21) provided in the vehicle 1. For example, the calculation unit 32 may display an automatic parking-related screen PS, which will be described later, on the touch panel 21 in response to receiving the operation for executing the automatic parking.

The EPS system 40 includes a steering angle sensor 41, a torque sensor 42, an EPS motor 43, a resolver 44, and an EPS electronic control unit (EPS ECU) 45. The steering angle sensor 41 detects a steering angle θst of the steering wheel 46. The torque sensor 42 detects a torque TQ applied to the steering wheel 46.

The EPS motor 43 applies a driving force or a reaction force to a steering column 47 connected to the steering wheel 46, thereby enabling assistance of an operation performed by the driver on the steering wheel 46 and enabling automatic steering during the automatic parking. The resolver 44 detects a rotation angle θm of the EPS motor 43. The EPS ECU 45 controls the entire EPS system 40. The EPS ECU 45 includes an input and output unit, a calculation unit, and a storage unit (all not shown).

The communication unit 50 is a communication interface that communicates with an external device 2 provided outside the vehicle 1 under control of the control device 30. That is, the control device 30 may communicate with the external device 2 via the communication unit 50. For example, a mobile communication network such as a cellular line, Wi-Fi (registered trademark), or Bluetooth (registered trademark) may be adopted for the communication between the vehicle 1 and the external device 2. The external device 2 is managed by, for example, a manufacturer of the vehicle 1. The external device 2 may be a virtual server (cloud server) implemented in cloud computing service, or may be a physical server implemented as one device.

The driving force control system 60 includes a driving ECU 61. The driving force control system 60 executes driving force control of the vehicle 1. The driving ECU 61 controls a driving force of the vehicle 1 by controlling an engine or the like (not shown) based on an operation performed on an accelerator pedal (not shown) by the user or an instruction from the control device 30.

The braking force control system 70 includes a braking ECU 71. The braking force control system 70 executes braking force control of the vehicle 1. The braking ECU 71 controls a braking force of the vehicle 1 by controlling a brake mechanism or the like (not shown) based on an operation performed on a brake pedal (not shown) by the user.

(Screen Related to Automatic Parking)

Next, regarding the automatic parking, specific examples of a display screen displayed on the touch panel 21 by the control device 30 will be described with reference to FIGS. 2 to 9B.

Figure 2:
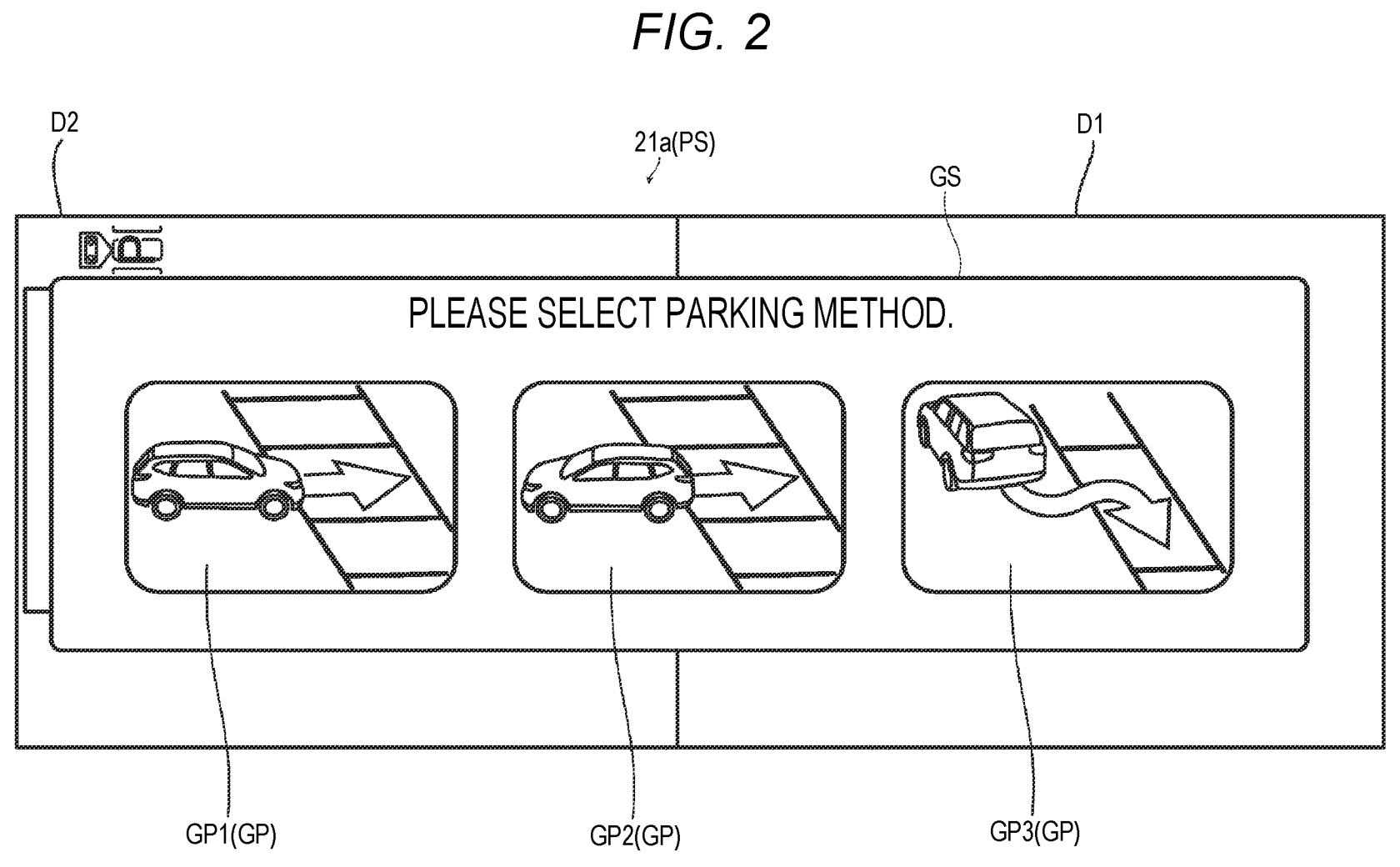
Figure 3:
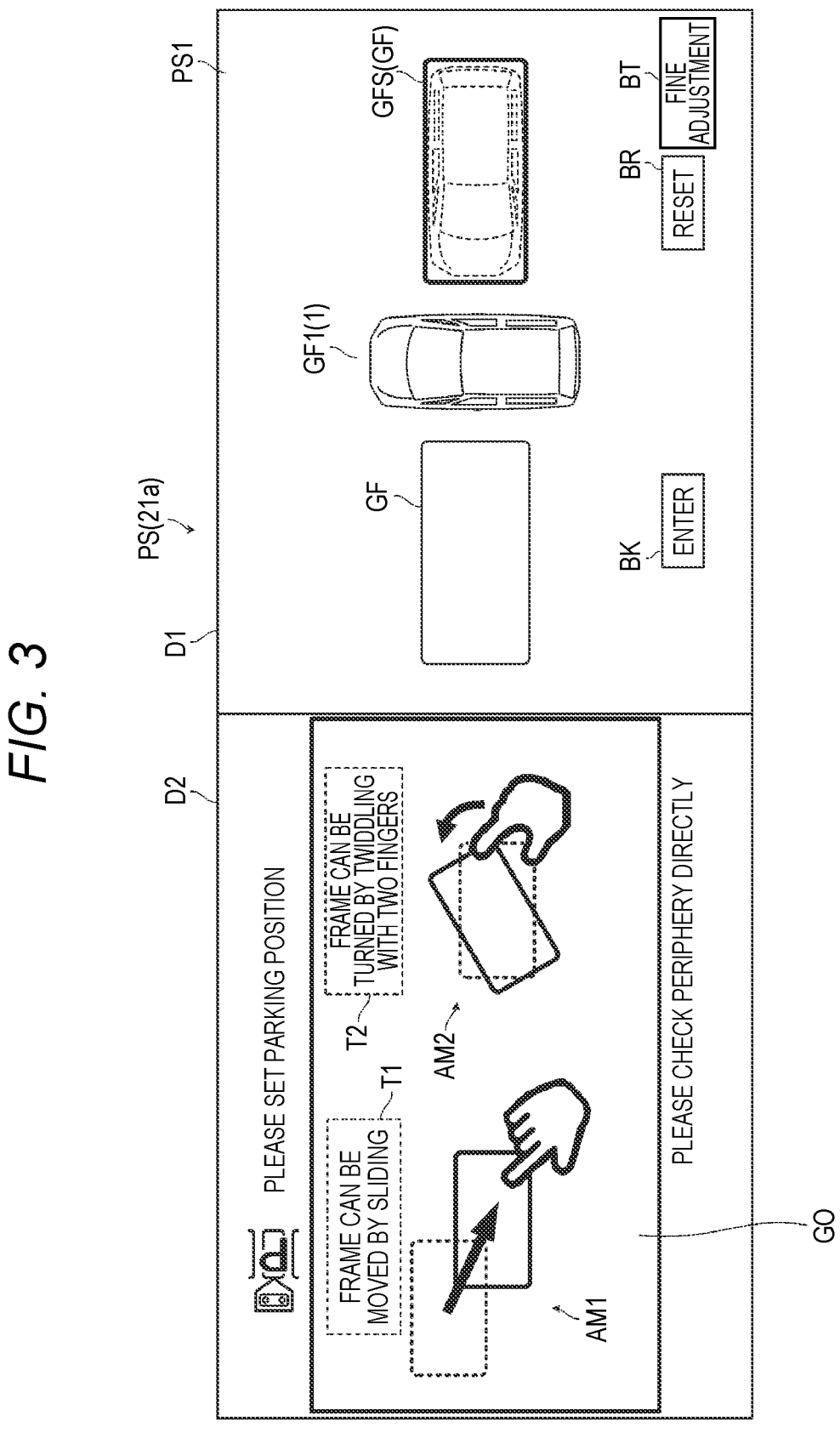
FIG. 3 is a diagram (part 2) showing an example of an automatic parking-related screen displayed on the touch panel 21 by the control device 30 regarding automatic parking.
Figure 5:
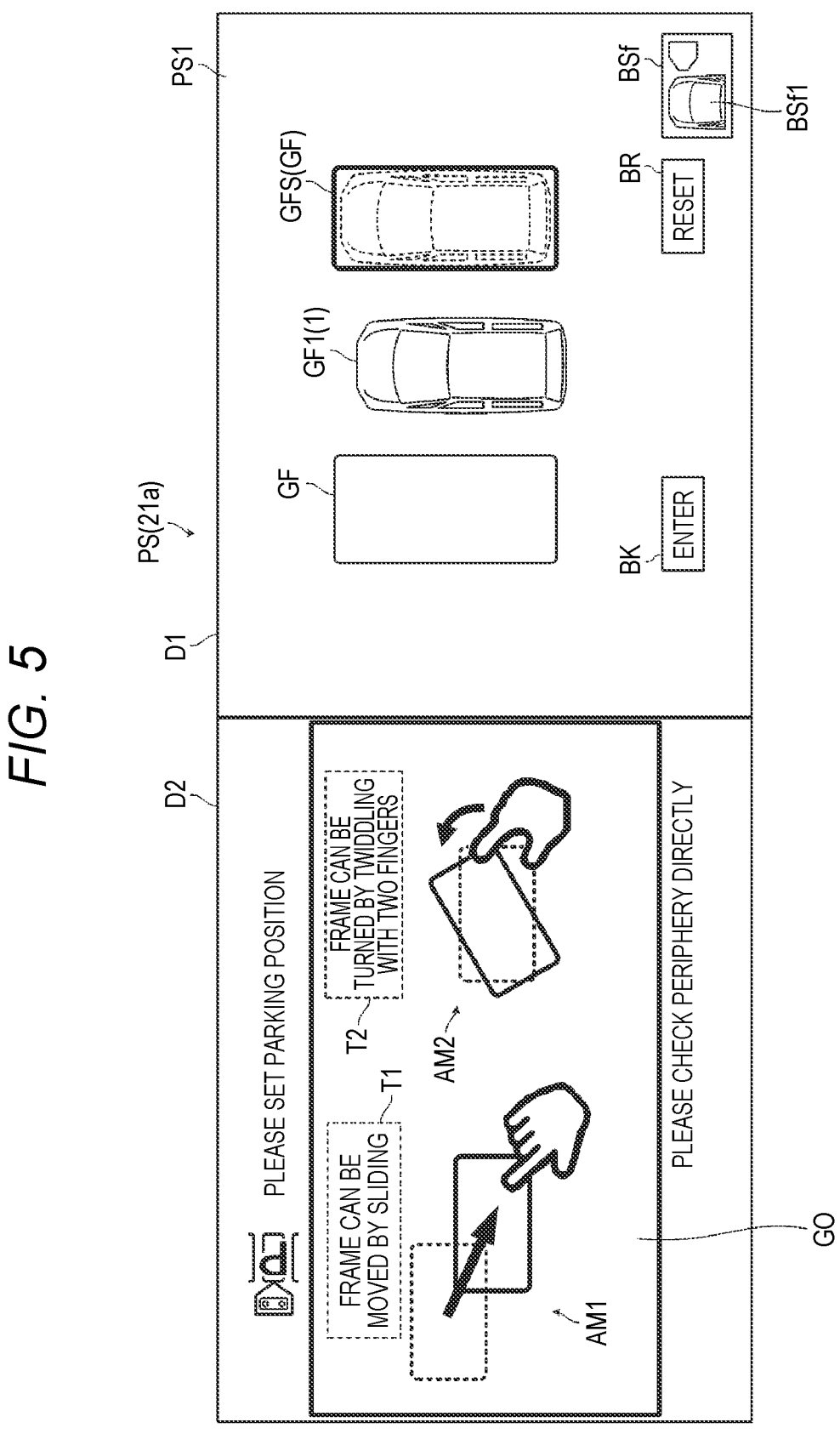
FIG. 5 is a diagram (part 3) showing an example of an automatic parking-related screen displayed on the touch panel 21 by the control device 30 regarding automatic parking.

As shown in FIGS. 2, 3 and 5, the touch panel 21 has a rectangular and horizontally long display area 21*a*. A right half area of the display area 21*a* is used as a first display area D1, and a left half area of the display area 21*a* is used as a second display area D2.

In the display area 21*a* of the touch panel 21, for example, a screen related to automatic parking (hereinafter also referred to as "automatic parking-related screen PS") is displayed. The automatic parking-related screen PS may include various images for the user to make various settings related to automatic parking.

For example, the automatic parking-related screen PS may include a parking method selection image GS, as shown in FIG. 2. As shown in FIGS. 3 to 9B, the automatic parking-related screen PS includes a top view image PS1, a candidate position image GF, an adjustment button group image (hereinafter simply referred to as "adjustment button group") GB, an operation guide image (hereinafter simply referred to as "operation guide") GO, an enter button image (hereinafter also simply referred to as "enter button") BK, a reset button image (hereinafter also simply referred to as "reset button") BR, a fine adjustment mode button BT, a normal adjustment mode button BG, a front portion display button BSf, a rear portion display button BSr, a whole body display button BSw, an entry prohibition setting image GR, and the like. Details of these various images will be described later.

As shown in FIG. 2, the parking method selection image GS is displayed across the first display area D1 and the second display area D2. The parking method selection image GS includes a parking pattern image GP1 indicating the forward parking pattern, a parking pattern image GP2 indicating the backward parking pattern, and a parking pattern image GP3 indicating the parallel parking pattern as the parking pattern image GP indicating parking pattern (that is, parking methods). For example, by tapping (for example, lightly tapping with a fingertip) any one of the parking pattern images GP1, GP2, and GP3, the user may instruct the control device 30 to perform automatic parking according to the parking pattern indicated by the parking pattern image.

(Image Capable of being Displayed in First Display Area)

Figure 4A:
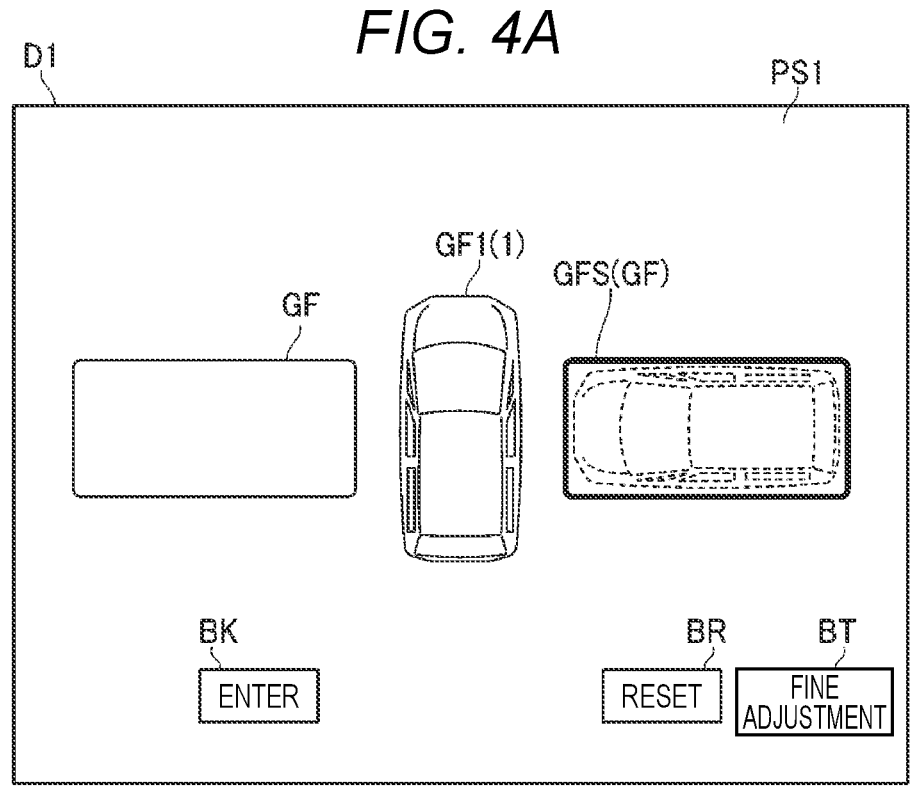
FIG. 4A is a diagram showing an example of a first display area D1 before a fine adjustment mode button BT and a normal adjustment mode button BG are operated.
Figure 4B:
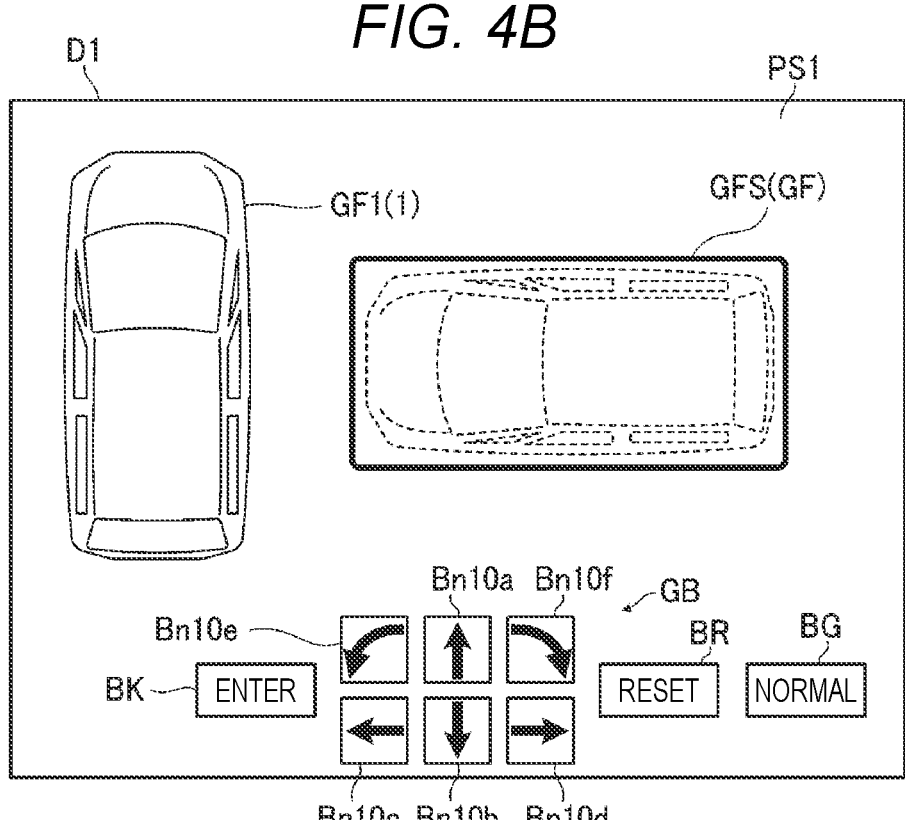
FIG. 4B is a diagram showing an example of a first display area D1 after the fine adjustment mode button BT and the normal adjustment mode button BG are operated.
Figure 7A:
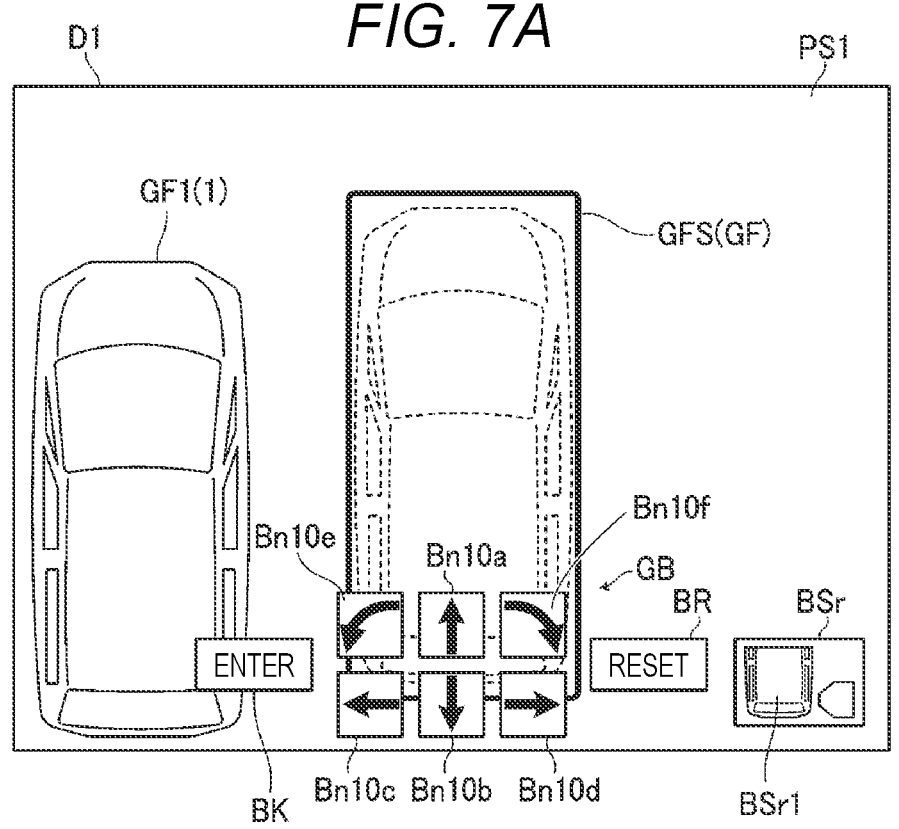
FIG. 7A is a diagram showing an example of the first display area D1 before a rear portion display button BSr is operated.
Figure 7B:
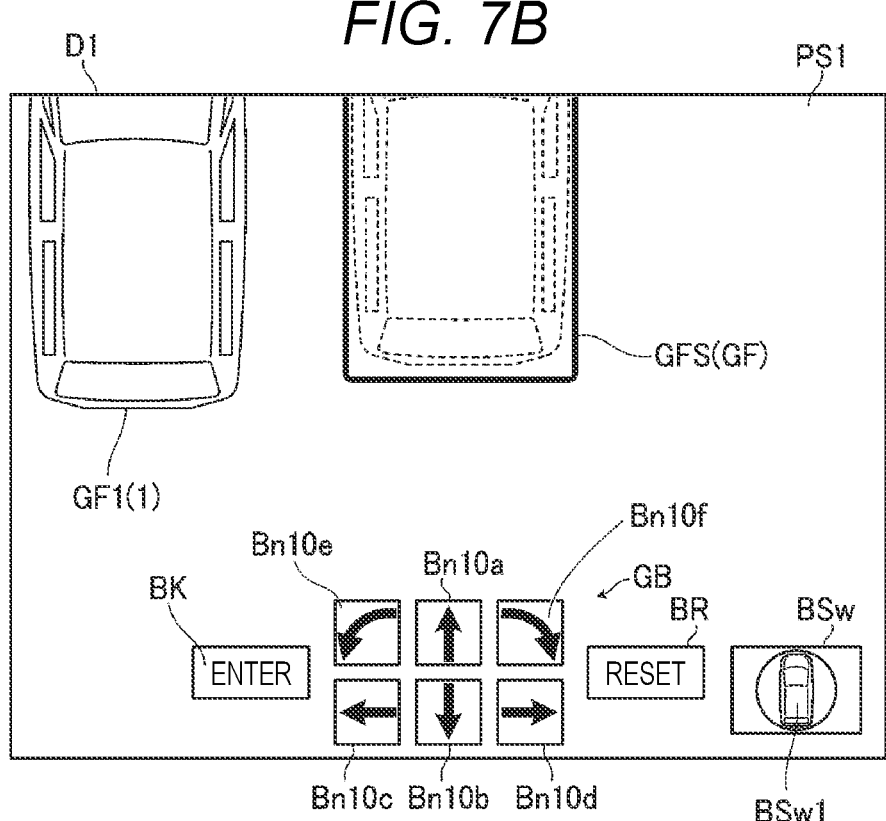
FIG. 7B is a diagram showing an example of the first display area D1 after the rear portion display button BSr is operated.
Figure 8A:
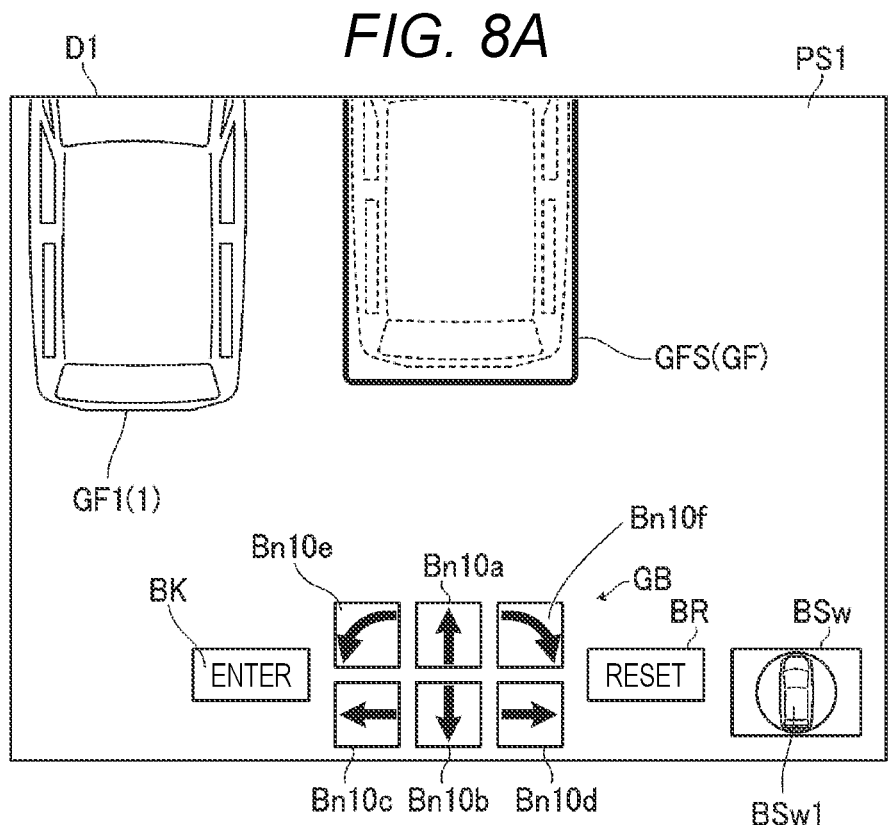
FIG. 8A is a diagram showing an example of the first display area D1 before a whole body display button BSw is operated.
Figure 8B:
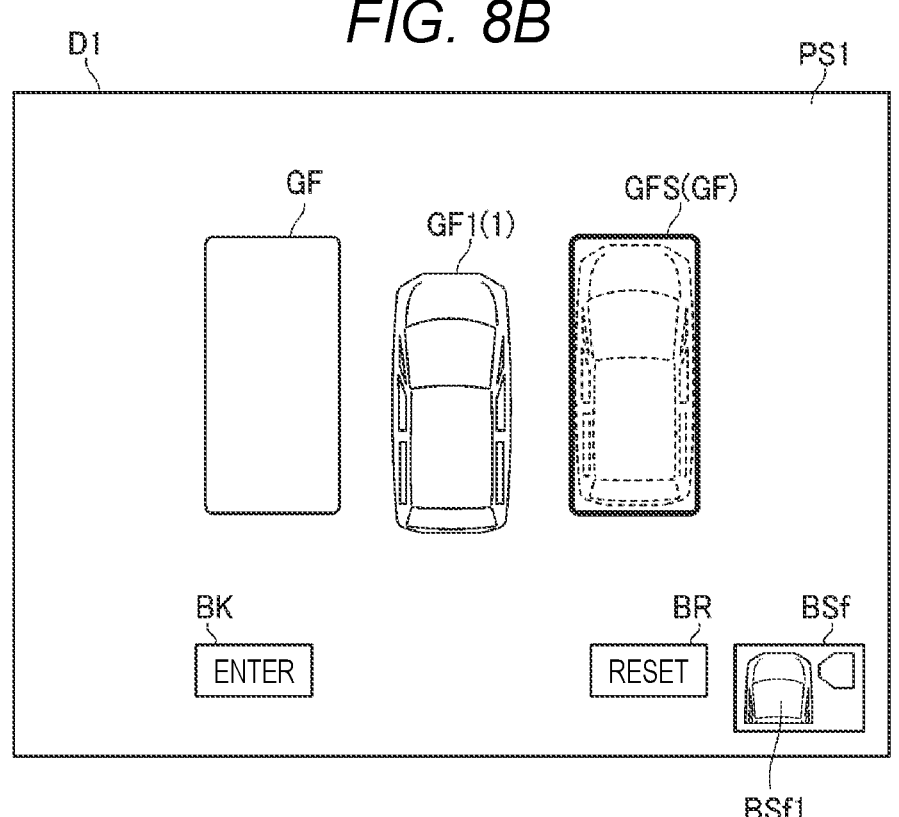
FIG. 8B is a diagram showing an example of the first display area D1 after the whole body display button BSw is operated.
Figures 9A, 9B:
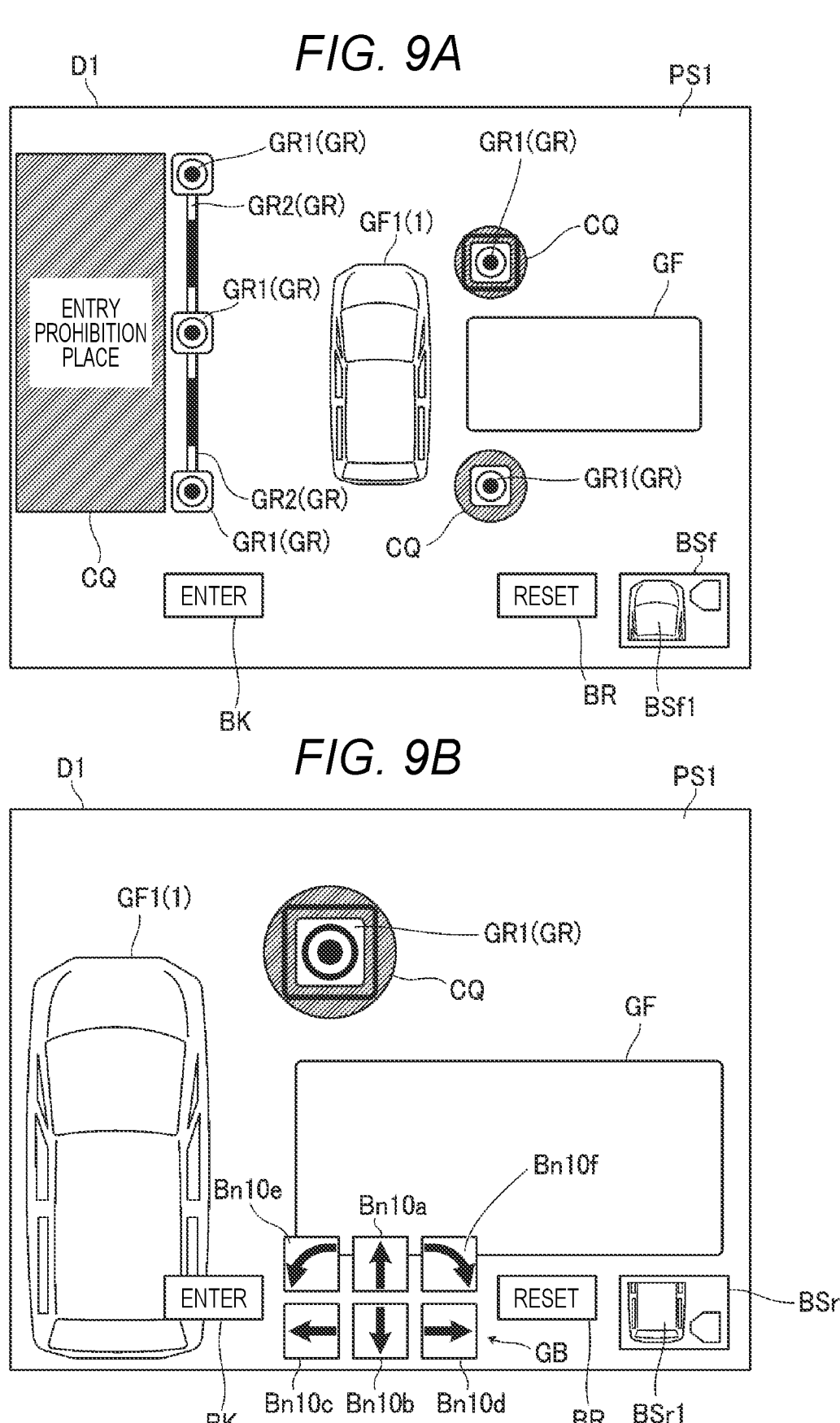
FIG. 9A is a diagram showing an example of the first display area D1 before the front portion display button BSf is operated when an entry prohibition setting image GR is displayed.
FIG. 9B is a diagram showing an example of the first display area D1 after the front portion display button BSf is operated when an entry prohibition setting image GR is displayed.

As shown in FIGS. 3 to 9B, the first display area D1 may display the top view image PS1, the candidate position image GF, the adjustment button group GB, the enter button BK, the reset button BR, and the like. As shown in FIGS. 3 to 4B, the fine adjustment mode button BT and the normal adjustment mode button BG may be displayed in the first display area D1. Furthermore, as shown in FIGS. 5 to 8B, the front portion display button BSf, the rear portion display button BSr, and the whole body display button BSw may be displayed in the first display area D1. As shown in FIGS. 9A and 9B, the entry prohibition setting images GR may also be displayed in the first display area D1.

(Top View Image)

The top view image PS1 shown in FIG. 3 and the like is an image obtained by viewing the vehicle 1 and the surroundings thereof from directly above, and includes a host vehicle image GF1 as an image showing the vehicle 1. The top view image PS1 is generated, for example, based on the surrounding images obtained by capturing images of the surroundings of the vehicle 1 with the front camera 11a, the rear camera 11b, the left side camera 11c, and the right side camera 11d.

(Candidate Position Image)

The candidate position image GF shown in FIG. 3 and the like is an image indicating a candidate parking position, which is a candidate for the parking position, and is displayed in a superimposed manner on the top view image PS1. For example, the candidate position image GF is a frame image showing an outline of the candidate parking position. In the examples shown in FIGS. 3 and 5, the candidate position images GF are respectively displayed on left and right sides of the host vehicle image GF1 in the top view image PS1. The user may select the candidate position image GF by, for example, tapping any one of the displayed candidate position images GF.

When the vehicle 1 performs perpendicular parking by automatic parking (that is, when the perpendicular parking pattern is selected by the user), the candidate position image GF is displayed horizontally as shown in FIG. 3 in a default state. On the other hand, when the vehicle 1 performs parallel parking by automatic parking (that is, when the parallel parking pattern is selected by the user), the candidate position image GF is displayed vertically as shown in FIG. 5 in a default state.

The selected candidate position image GF is, for example, highlighted so as to be distinguishable from other candidate position images GF (that is, non-selected candidate position images GF). Hereinafter, the selected candidate position image GF is also referred to as "selected candidate position image GFS". This selected candidate position image GFS is a frame image indicating a parking position set as a target position when the vehicle 1 is parked by automatic parking.

Note that, the selected candidate position image GFS may be highlighted, for example, by displaying the selected candidate position image GFS with a thicker outline than an outline of other candidate position images GF, or with a different color applied to the outline of the selected candidate position image GF from a color applied to the outline of other candidate position images GF.

In the frame shown by the selected candidate position image GFS, for example, an image showing the vehicle 1 is displayed in a translucent manner. The image of the vehicle 1, which is displayed in the frame of the selected candidate position image GFS (see the dashed lines in the frame of the selected candidate position image GFS in FIGS. 3 to 8B), may provide the user with an easy-to-understand guide as to what happens when the vehicle 1 is parked at the parking position indicated by the selected candidate position image GFS.

Each candidate position image GF may be moved in an up-down direction and a left-right direction and rotated within the first display area D1 by touching the candidate position image GF or by tapping an adjustment button in the adjustment button group GB. Touch operations on the candidate position image GF include swipe (moving one finger in the up-down direction and the left-right direction while touching the screen) and multi-swipe (moving two or more fingers in the up-down direction and the left-right direction while touching the screen).

As an example, by swiping any candidate position image GF, the user may perform an operation to make the candidate position image GF slide (in other words, translate). The user may perform an operation to make the candidate position image GF rotate counterclockwise or clockwise in the first display area D1 by multi-swiping any candidate position image GF.

(Adjustment Button Group)

The adjustment button group GB shown in FIG. 4B and the like is an operation button group for adjusting position and angle of the selected candidate position image GFS. As shown in FIG. 4B and the like, the adjustment button group GB includes an up button Bn10a, a down button Bn10b, a left button Bn10c, a right button Bn10d, a left rotation button Bn10e, and a right rotation button Bn10f. As shown in FIG. 4B and the like, the adjustment button group GB is displayed, for example, in a central portion of a lower end portion of the first display area D1. In the present description and the like, the up button Bn10a, the down button Bn10b, the left button Bn10c, the right button Bn10d, the left rotation button Bn10e, and the right rotation button Bn10f are collectively referred to as "adjustment button".

(Enter Button)

The enter button BK shown in FIG. 3 and the like is an operation button image for determining (in other words, setting) the position indicated by the selected candidate position image GFS as the parking position. The reset button BR shown in FIG. 3 and the like is an operation button image for resetting all operations performed on the candidate position image GF (in other words, returning the candidate position image GF to default position and angle). As shown in FIG. 3 and the like, for example, the enter button BK is displayed near the lower left end of the first display area D1, and the reset button BR is displayed near the lower right end of the first display area D1.

(Fine Adjustment Mode Button and Normal Adjustment Mode Button)

The fine adjustment mode button BT and the normal adjustment mode button BG shown in FIGS. 3 to 4B are displayed in the first display area D1 when perpendicular parking is performed by automatic parking (that is, when the perpendicular parking pattern is selected by the user). The fine adjustment mode button BT and the normal adjustment mode button BG are operation button images for switching the display of the first display area D1 when perpendicular parking is performed by automatic parking.

More specifically, as shown in FIG. 3 and FIG. 4A, the fine adjustment mode button BT is displayed near the lower right end of the first display area D1 (for example, on the right side of the reset button BR) when the top view image PS1 is displayed in a normal manner. Here, the display in the normal manner (normal display) is a display in a non-enlarged display state (that is, a non-enlarged display). On the other hand, as shown in FIG. 4B, the normal adjustment mode button BG is displayed near the lower right end of the first display area D1 (for example, on the right side of the reset button BR) when the top view image PS1 is displayed in an enlarged manner.

In present embodiment, in response to the fine adjustment mode button BT shown in FIG. 4A being tapped, the top view image PS1 and the candidate position image GF are displayed, as shown in FIG. 4B, in an enlarged manner as compared with the normal display, and the normal adjustment mode button BG is displayed instead of the fine adjustment mode button BT that is displayed until then.

When the normal adjustment mode button BG shown in FIG. 4B is tapped, the display of the top view image PS1 and the candidate position image GF return to the normal display as shown in FIG. 4A, and the fine adjustment mode button BT is displayed instead of the normal adjustment mode button BG that is displayed until then.

Accordingly, in the present embodiment, when perpendicular parking is performed by automatic parking, the display in the first display area D1 is switched between the normal display and the enlarged display according to the operation on the fine adjustment mode button BT and the normal adjustment mode button BG.

As shown in FIG. 4A, during the normal display when perpendicular parking is performed by automatic parking, the top view image PS1 is displayed in the first display area D1 with the host vehicle image GF1 as the substantial center.

On the other hand, as shown in FIG. 4B, during the enlarged display when perpendicular parking is performed by automatic parking, the top view image PS1 whose display range is a predetermined range (first range) including one of left and right sides of the host vehicle image GF1 (that is, the vehicle 1 in the top view image PS1) is displayed in the first display area D1. More specifically, in this case, as shown in FIG. 4B, if the selected candidate position image GFS indicating the parking position set as the target position is on the right side of the host vehicle image GF1, the top view image PS1 whose display range is a predetermined range on the right side of the host vehicle image GF1 including the selected candidate position image GFS is displayed in the first display area D1. If the selected candidate position image GFS is on the left side of the host vehicle image GF1, the top view image PS1 whose display range is a predetermined range on the left side of the host vehicle image GF1 including the selected candidate position image GFS is displayed in the first display area D1. In other words, the top view image PS1 displayed in the enlarged manner when the perpendicular parking is performed by automatic parking does not substantially include the range of the right side or left side of the host vehicle image GF1 at which the selected candidate position image GFS is not positioned.

(Front Portion Display Button, Rear Portion Display Button, and Whole Body Display Button)

The front portion display button BSf, the rear portion display button BSr, and the whole body display button BSw shown in FIGS. 5 to 8B are displayed in the first display area D1 when parallel parking is performed by automatic parking (that is, when the parallel parking pattern is selected by the user). The front portion display button BSf, the rear portion display button BSr, and the whole body display button BSw are operation button images for switching the display of the first display area D1 when parallel parking is performed by automatic parking.

Figure 6A:
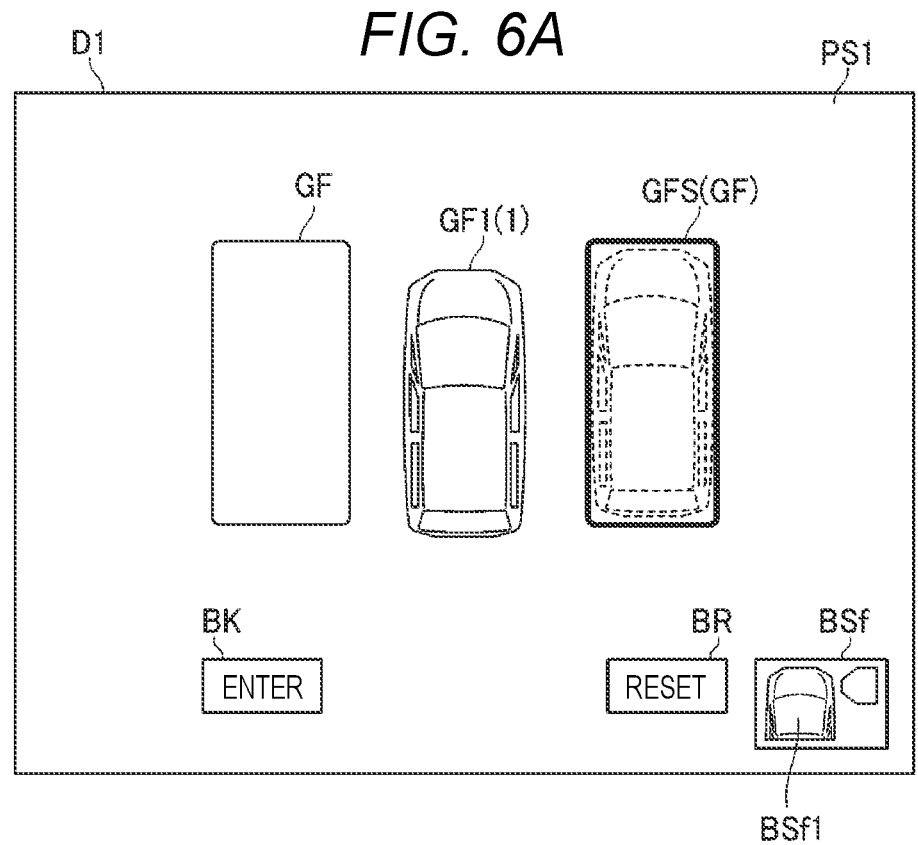
FIG. 6A is a diagram showing an example of the first display area D1 before a front portion display button BSf is operated.

More specifically, as shown in FIG. 5 and FIG. 6A, the front portion display button BSf is displayed near the lower right end of the first display area D1 (for example, on the right side of the reset button BR) when the top view image PS1 is displayed in a normal manner. For example, the front portion display button BSf includes an image BSf1 showing the front portion of the vehicle 1.

Figure 6B:
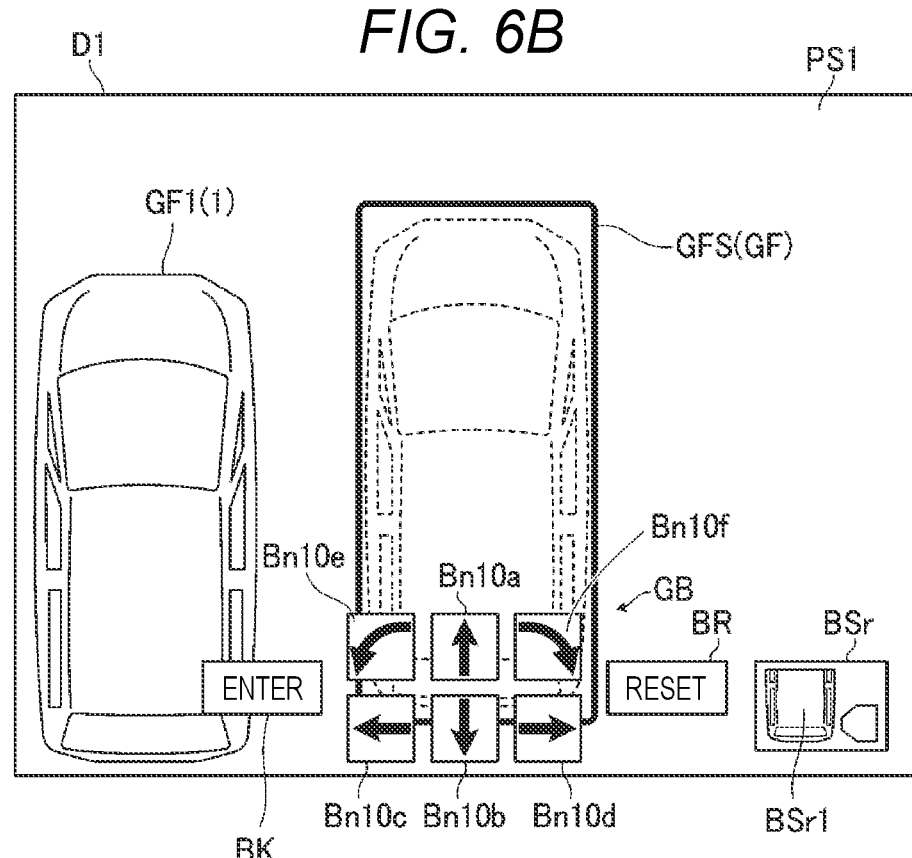
FIG. 6B is a diagram showing an example of the first display area D1 after the front portion display button BSf is operated.

As shown in FIG. 6B and FIG. 7A, when the top view image PS1 is displayed in an enlarged manner focusing on an upper side of the host vehicle image GF1 (that is, a front side of the vehicle 1 in the top view image PS1), the rear portion display button BSr is displayed near the lower right end of the first display area D1 (for example, on the right side of the reset button BR). For example, the rear portion display button BSr includes an image BSr1 showing the rear portion of the vehicle 1.

As shown in FIG. 7B, when the top view image PS1 is enlarged and displayed in a manner of focusing on a lower side of the host vehicle image GF1 (that is, a rear side of the vehicle 1 in the top view image PS1), the whole body display button BSw is displayed near the lower right end of the first display area D1 (for example, on the right side of the reset button BR). For example, the whole body display button BSw includes an image BSw1 showing the entire vehicle 1.

In the present embodiment, when the front portion display button BSf shown in FIG. 6A is tapped, as shown in FIG. 6B, the top view image PS1 and the candidate position image GF are displayed in an enlarged manner focusing on the upper side of the host vehicle image GF1, and the rear portion display button BSr is displayed instead of the front portion display button BSf that is displayed until then. Hereinafter, the display in the enlarged manner focusing on the upper side of the host vehicle image GF1 is also referred to as "front side enlarging display".

When the rear portion display button BSr shown in FIG. 7A is tapped, as shown in FIG. 7B, the top view image PS1 and the candidate position image GF are displayed in an enlarged manner focusing on the lower side of the host vehicle image GF1, and the whole body display button BSw is displayed instead of the rear portion display button BSr that is displayed until then. Hereinafter, the display in the enlarged manner focusing on the lower side of the host vehicle image GF1 is also referred to as "rear side enlarging display".

When the whole body display button BSw shown in FIG. 8A is tapped, as shown in FIG. 8B, the top view image PS1 and the candidate position image GF return to the normal display, and the front portion display button BSf is displayed instead of the whole body display button BSw that is displayed until then.

Accordingly, in the present embodiment, when parallel parking is performed by automatic parking, the display of the first display area D1 is sequentially switched among the normal display, the front side enlarging display, and the rear side enlarging display according to the operation on the front portion display button BSf, the rear portion display button BSr, and the whole body display button BSw. More specifically, when the front portion display button BSf is operated during the normal display, the display is switched to the front side enlarging display. When the rear portion display button BSr is operated during the front side enlarging display, the display is switched to the rear side enlarging display. When the whole body display button BSw is operated during the rear side enlarging display, the display is switched to the normal display.

As shown in FIG. 5 and FIG. 6A, during the normal display when parallel parking is performed by automatic parking, the top view image PS1 is displayed in the first display area D1 with the host vehicle image GF1 as the substantial center similarly to the normal display when perpendicular parking is performed by automatic parking.

On the other hand, as shown in FIG. 6B and FIG. 7A, during the front side enlarging display when parallel parking is performed by automatic parking, the top view image PS1 whose display range is a predetermined range (third range) including the upper side (that is, the front side of the vehicle 1 in the top view image PS1) and one of the left and right sides of the host vehicle image GF1 is displayed in the first display area D1. More specifically, in this case, as shown in FIG. 6B, in a case where the selected candidate position image GFS indicating the parking position set as the target position is on the right side of the host vehicle image GF1, the top view image PS1 whose display range is a predetermined range including a range on the right side of the host vehicle image GF1 including the selected candidate position image GFS and a range directly above the host vehicle image GF1 is displayed in the first display area D1. In a case where the selected candidate position image GFS is on the left side of the host vehicle image GF1, the top view image PS1 whose display range is a predetermined range including a range on the left side of the host vehicle image GF1 including the selected candidate position image GFS and a range directly above the host vehicle image GF1 is displayed in the first display area D1. In other words, the top view image PS1 in the front side enlarging display does not substantially include the range below the host vehicle image GF1 (that is, the rear side of the vehicle 1 in the top view image PS1).

As shown in FIG. 7B and FIG. 8A, during the rear side enlarging display when parallel parking is performed by automatic parking, the top view image PS1 whose display range is a predetermined range (fourth range) including the lower side and one of the left side and the right side of the host vehicle image GF1 is displayed in the first display area D1. More specifically, in this case, as shown in FIG. 7B, in a case where the selected candidate position image GFS indicating the parking position set as the target position is on the right side of the host vehicle image GF1, the top view image PS1 whose display range is a predetermined range including a range on the right side of the host vehicle image GF1 including the selected candidate position image GFS and a range directly below the host vehicle image GF1 is displayed in the first display area D1. In a case where the selected candidate position image GFS is on the left side of the host vehicle image GF1, the top view image PS1 whose display range is a predetermined range including a range on the left side of the host vehicle image GF1 including the selected candidate position image GFS and a range directly below the host vehicle image GF1 is displayed in the first display area D1. In other words, the top view image PS1 during the rear side enlarging display does not substantially include the range above the host vehicle image GF1.

(Entry Prohibition Setting Image)

The entry prohibition setting images GR shown in FIGS. 9A and 9B are images for setting an entry prohibition place during movement associated with automatic parking. As shown in FIG. 9A, the entry prohibition setting image GR is displayed in a superimposed manner on the top view image PS1. The entry prohibition setting image GR includes, for example, a cone image GR1 imitating a traffic cone (pylon) and a bar image GR2 imitating a traffic cone bar.

In the example of FIG. 9A, five cone images GR1 and two bar images GR2 are displayed in the top view image PS1. More specifically, two of the five cone images GR1 are displayed above and below a left side of the candidate position image GF positioned on the right side of the host vehicle image GF1, and the remaining three thereof are displayed on the left side of the host vehicle image GF1, aligned substantially parallel to the host vehicle image GF1.

The cone image GR1 may be selected by tapping, or may be moved or rotated by a touch operation or the adjustment button group GB, for example, similarly to the candidate position image GF described above. In the example of FIG. 9A, since the cone image GR1 on the upper left end of the candidate position image GF is selected, the cone image GR1 is highlighted by a thick frame line. The bar images GR2 are automatically displayed when, for example, the cone images GR1 are arranged side by side at an interval equal to or less than a predetermined distance (a distance through which the vehicle 1 cannot easily pass). In the example of FIG. 9A, positions (places) corresponding to locations indicated by hatchings and a reference character CQ in FIG. 9A are set as the entry prohibition places by the cone images GR1 and bar images GR2.

In the present embodiment, as shown in FIG. 9A and FIG. 9B, even when an entry prohibition place is set (in other words, the entry prohibition setting image GR is provided), the top view image PS1 in front side enlarging display and the top view image PS1 in rear side enlarging display may be displayed in the first display area D1.

More specifically, in a case where an entry prohibition place is set and the front portion display button BSf shown in FIG. 9A is tapped, as shown in FIG. 9B, the front side enlarged display is displayed as the top view image PS1, and the rear portion display button BSr is displayed instead of the front portion display button BSf that is displayed until then. When the rear portion display button BSr shown in FIG. 9B is tapped, the rear side enlarging display is displayed as the top view image PS1, as in FIG. 7B, and the front portion display button BSf is displayed instead of the rear portion display button BSr that is displayed until then.

According to the present embodiment, even when an entry prohibition place is set using the entry prohibition setting image GR, the front side enlarging display and the rear side enlarging display of the top view image PS1 are still possible. Therefore, the user may easily understand a positional relation between the host vehicle image GF1 and the entry prohibition setting image GR. Further, user convenience when finely adjusting the position of the entry prohibition setting image GR is enhanced.

Note that when receiving an operation to set an entry prohibition place via the input and output unit 31 or the like for example, the control device 30 causes the touch panel 21 to display the top view image PS1 and the like shown in FIGS. 9A and 9B to enable an entry prohibition place to be set using the top view image PS1 and the entry prohibition setting image GR.

(Image Capable of being Displayed in Second Display Area)

Next, images that may be displayed in a second display area D2 will be described. As shown in FIGS. 3 and 5, an operation guide GO may be displayed in the second display area D2.

The operation guide GO is an image for showing the user how to perform a touch operation on the candidate position image GF, and includes, for example, animations AM1 and AM2 indicating that the candidate position image GF is slidable or slidable by swiping or multi-swiping the candidate position image GF, and explanatory texts T1 and T2 for each of the animations AM1 and AM2.

Note that although the animations AM1 and AM2 and the explanatory texts T1 and T2 are included in the operation guide GO here from the viewpoint of ease of understanding for the user, the present disclosure is not limited thereto. For example, a still image indicating that the candidate position image GF is slidable or rotatable by swiping or multi-swiping the candidate position image GF may be included in the operation guide GO instead of the animations AM1 and AM2. For example, in a case where it is considered that the animations AM1, AM2 or the alternative still image may sufficiently provide the user with explanation that the candidate position image GF is slidable or rotatable by swiping or multi-swiping the candidate position image GF, the explanatory texts T1 and T2 may be omitted.

(Example of Processing Executed by Control Device)

Next, regarding automatic parking, an example of processing executed by the control device 30 will be described with reference to FIGS. 2 to 8B.

In response to receiving an operation for executing the automatic parking, the control device 30 first causes the touch panel 21 to display the parking method selection image GS shown in FIG. 2. Then, when receiving selection of the parking pattern image GP2 (that is, selection of backward parking) via the parking method selection image GS, the control device 30 causes the touch panel 21 to display the display screen shown in FIG. 3. That is, in this case, as shown in FIG. 3 and FIG. 4A, the control device 30 displays the top view image PS1 in normal display and the fine adjustment mode button BT in the first display area D1.

While the top view image PS1 in normal display and the fine adjustment mode button BT are displayed, the control device 30 determines whether the fine adjustment mode button BT is tapped. Then, when it is determined that the fine adjustment mode button BT is tapped, the control device 30 enlarges and displays the top view image PS1 and displays the normal adjustment mode button BG instead of the fine adjustment mode button BT as shown in FIG. 4B.

While the top view image PS1 is displayed in an enlarged manner and the normal adjustment mode button BG is displayed, the control device 30 determines whether the normal adjustment mode button BG is tapped. Then, when it is determined that the normal adjustment mode button BG is tapped, the control device 30 returns the top view image PS1 to the normal display, and displays the fine adjustment mode button BT instead of the normal adjustment mode button BG as shown in FIG. 4A.

Therefore, when backward parking is performed by automatic parking, the user may cause the touch panel 21 to perform a desired display between the normal display shown in FIG. 4A and the enlarged display shown in FIG. 4B by operating the fine adjustment mode button BT and the normal adjustment mode button BG. Note that the case where backward parking is performed by automatic parking has been described here, but the same applies to the case where forward parking is performed by automatic parking (that is, selection of the parking pattern image GP1 is received).

When receiving selection of the parking pattern image GP3 (that is, selection of parallel parking) via the parking method selection image GS displayed on the touch panel 21, the control device 30 causes the touch panel 21 to display the display screen shown in FIG. 5. That is, in this case, as shown in FIG. 5 and FIG. 6A, the control device 30 displays the top view image PS1 in a normal manner and the front portion display button BSf in the first display area D1.

While the top view image PS1 is displayed in the normal manner and the front portion display button BSf is displayed, the control device 30 determines whether the front portion display button BSf is tapped. Then, when it is determined that the front portion display button BSf is tapped, the control device 30 displays the front side enlarging display as the top view image PS1 and displays the rear portion display button BSr in place of the front portion display button BSf as shown in FIG. 6B and FIG. 7A.

While the front side enlarging display is displayed as the top view image PS1 and the rear portion display button BSr is displayed, the control device 30 determines whether the rear portion display button BSr is tapped. Then, when it is determined that the rear portion display button BSr is tapped, the control device 30 displays the rear side enlarging display as the top view image PS1 and displays the whole body display button BSw in place of the rear portion display button BSr as shown in FIG. 7B and FIG. 8A.

While the rear side enlarging display as the top view image PS1 and the whole body display button BSw are displayed, the control device 30 determines whether the whole body display button BSw is tapped. Then, when it is determined that the whole body display button BSw is tapped, the control device 30 returns the top view image PS1 to normal display and displays the front portion display button BSf instead of the whole body display button BSw as shown in FIG. 8B.

Therefore, when parallel parking is performed by automatic parking, the user sequentially operates the front portion display button BSf, the rear portion display button BSr, and the whole body display button BSw to sequentially switch the display in the first display area D1 from the normal display to the front side enlarging display, from the front side enlarging display to the rear side enlarging display, and from the rear side enlarging display to the normal display, so that a desired display may be displayed on the touch panel 21.

When the automatic parking-related screen PS shown in FIGS. 2 to 8B is displayed on the touch panel 21, that is, when the enter button BK is displayed, the control device 30 determines whether the enter button BK is tapped. Then, when it is determined that the enter button BK is tapped, the control device 30 sets a position indicated by the selected candidate position image GFS as the parking position, and automatic parking based on the parking pattern selected by the user is performed in the parking position. In this way, the user may park the vehicle 1 at a desired parking position by a desired parking method.

As described above, when perpendicular parking or parallel parking is performed by automatic parking, the control device 30 of the present embodiment may cause the touch panel 21 to display the top view image PS1, and to superimpose and display the candidate position image GF (selected candidate position image GFS) indicating the parking position set as the target position on the top view image PS1. The control device 30 may enlarge and display the top view image PS1 displayed on the touch panel 21 according to an instruction (in other words, an operation) from the user. The control device 30 may make the display range when the top view image PS1 is enlarged and displayed in a case where the perpendicular parking is performed by automatic parking different from the display range in a case where the parallel parking is performed by automatic parking.

Therefore, the control device 30 may appropriately enlarge and display the top view image PS1 according to the parking method to the parking position set as the target position, and may effectively utilize the limited display area 21a of the touch panel 21 to present necessary information to the user in an easy-to-understand manner. Therefore, in addition to the user convenience, the operability of the vehicle 1 may be improved. It is also be possible to further improve traffic safety and contribute to development of a sustainable transportation system.

When perpendicular parking is performed by automatic parking, the control device 30 sets the display range of the enlarged display of the top view image PS1 to a predetermined range including one of the left side and the right side of the vehicle 1 (that is, the host vehicle image GF1) in the top view image PS1. On the other hand, when parallel parking is performed by automatic parking, the control device 30 sets the display range of the enlarged display of the top view image PS1 to a predetermined range including one side of the front side and the rear side of the vehicle 1 (that is, the up and down sides of the host vehicle image GF1) in the top view image PS1. As a result, the control device 30 may appropriately enlarge and display the top view image PS1 according to the parking method to the parking position set as the target position, and may effectively utilize the limited display area 21a of the touch panel 21 to present necessary information to the user in an easy-to-understand manner.

When parallel parking is performed by automatic parking, the control device 30 may switch the display range of the enlarged display of the top view image PS1 between a predetermined range that includes the front side of the vehicle 1 (that is, the upper side of the host vehicle image GF1) and does not include the rear side (that is, the lower side of the host vehicle image GF1) in the top view image PS1 (for example, see FIG. 7A and the like) and a predetermined range that includes the rear side and does not include the front side of the vehicle 1 in the top view image PS1 (for example, see FIG. 7B and the like). As a result, when parallel parking is performed by automatic parking, the control device 30 allows the user to mainly confirm the circumstances at the front side of the vehicle 1 or mainly confirm the circumstances at the rear side of the vehicle 1 via the enlarged display of the top view image PS1.

When parallel parking is performed by automatic parking, the control device 30 may sequentially switch the top view image PS1 to be displayed on the touch panel 21 among the normal display, the front side enlarging display, and the rear side enlarging display each time the user performs a predetermined operation. Accordingly, by performing a predetermined operation, the user may cause the touch panel 21 to display the desired display among the normal display, the front side enlarging display, and the rear side enlarging display, and it is possible to provide the user with information necessary for the user.

The control device 30 causes the touch panel 21 to display the front portion display button BSf including the image BSf1 showing the front portion of the vehicle 1 during the normal display, and switches from the normal display to the front side enlarging display when the front portion display button BSf is operated. The control device 30 causes the touch panel 21 to display the rear portion display button BSr including the image BSr1 showing the rear portion of the vehicle 1 during the front side enlarging display, and switches from the front side enlarging display to the rear side enlarging display when the rear portion display button BSr is operated. Furthermore, the control device 30 causes the touch panel 21 to display the whole body display button BSw including the image BSw1 showing the whole body of the vehicle 1 during the rear side enlarging display, and switches from the rear side enlarging display to the normal display when the whole body display button BSw is operated. As a result, by using the button image for switching the display of the touch panel 21, the control device 30 may suggest to the user the display to be switched to when the button image is operated, thereby improving the user convenience.

Even when an entry prohibition place is set during movement associated with the automatic parking, the control device 30 may switch the top view image PS1 between the front side enlarging display and the rear side enlarging display according to an operation from the user. As a result, the control device 30 may improve visibility of the top view image PS1 when the entry prohibition place is set, thereby making it easier to set the entry prohibition place and improving the user convenience.

In the present embodiment, the touch panel 21 has the rectangular and horizontally long display area 21a. When parallel parking is performed by automatic parking, it is considered that the user mainly moves the vertically oriented candidate position image GF in the upper-lower direction of the touch panel 21 to adjust the parking position set as the target position. In consideration of such circumstances, for example, if the top view image PS1 is displayed in an enlarged manner while ensuring a clearance that allows the vertically oriented candidate position image GF to move in the upper-lower direction of the touch panel 21 to some extent, the enlargement ratio may not be sufficiently ensured.

Contrarily, as in the present embodiment, when parallel parking is performed by automatic parking, by performing the enlarged display while dividing into the front side of the vehicle 1 in the top view image PS1 (that is, the upper side of the host vehicle image GF1) and the rear side of the vehicle 1 in the top view image PS1 (that is, the lower side of the host vehicle image GF1), it is possible to ensure a sufficient enlargement ratio for each enlarged display, and to improve the visibility for the user. By sufficiently increasing the enlargement ratio in this way, it is possible to prevent the entire candidate position image GF from being covered with various button images such as the adjustment button group GB, so that it is possible to ensure the visibility thereof.

Furthermore, by making display positions of various button images such as the adjustment button group GB substantially the same both when perpendicular parking is performed by automatic parking and when parallel parking is performed by automatic parking as in the present embodiment, it is possible to provide the user with the same operation feeling regardless of the parking method.

In contrast, it is assumed that the display positions of various button images such as the adjustment button group GB are made different between when perpendicular parking is performed by automatic parking and when parallel parking is performed by automatic parking in order to avoid overlap between the candidate position image GF whose orientation is variable according to the parking method and various button images such as the adjustment button group GB. In this case, the feeling of operation using various button images such as the adjustment button group GB may change depending on the parking method, which may confuse the user.

Although an embodiment of the present invention has been described above with reference to the accompanying drawings, it is needless to say that the present invention is not limited to the embodiment. It is apparent that those skilled in the art may conceive of various modifications and changes within the scope described in the claims, and it is understood that such modifications and changes naturally fall within the technical scope of the present invention. In addition, the respective constituent elements in the above embodiment may be combined as desired without departing from the gist of the invention.

For example, in the above embodiment, an example in which the control device is implemented by the control device 30 provided in the vehicle 1 is described, but the present disclosure is not limited thereto. Some or all of the functions of the control device 30 described above may be implemented by the external device 2 (for example, a server) that is communicable with the control device 30 via the communication unit 50. In that case, the external device 2 may control the display of the touch panel 21 as a display device via the control device 30 by appropriately transmitting a predetermined control signal to the control device 30.

In addition, in the above embodiment, an example is described in which the moving body is the vehicle 1 that is a four-wheeled automobile, but the present disclosure is not limited thereto. The moving body may also be a two-wheeled automobile (so-called motorcycle), the Segway (registered trademark), a ship, or an aircraft.

In the present specification, at least the following matters are described. Although corresponding constituent elements and the like in the above embodiment are shown in parentheses, the present disclosure is not limited thereto.

(1) A control device (control device 30) for controlling a display device (touch panel 21) mounted on a moving body (vehicle 1) that moves to a target position specified by a user by automatic steering, in which the moving body is configured to be capable of perpendicular parking into the target position and parallel parking into the target position, when the perpendicular parking or the parallel parking is performed, the control device causes the display device to display a top view image (top view image PS1) of the moving body and surroundings of the moving body, and to display a frame image (candidate position image GF, selected candidate position image GFS) indicating a place set as the target position superimposed on the top view image, the control device is capable of enlarging and displaying the top view image according to an instruction from the user, and the control device makes a display range when the top view image is enlarged and displayed different between when the perpendicular parking is performed and when the parallel parking is performed.

According to (1), the top view image obtained by viewing the moving body and the surroundings thereof from above may be appropriately enlarged and displayed according to the parking method to the target position, and the limited display area of the display device may be effectively utilized to present necessary information to the user in an easy-to-understand manner. Therefore, in addition to the user convenience, the operability of the moving body may be improved. It is also be possible to further improve traffic safety and contribute to development of a sustainable transportation system.

(2) The control device according to (1), in which the control device sets the display range to a first range when the perpendicular parking is performed, and sets the display range to a second range when the parallel parking is performed, the first range is a predetermined range including one of a left side and a right side of the moving body in the top view image, and the second range is a predetermined range including one of a front side and a rear side of the moving body in the top view image.

According to (2), the top view image may be appropriately enlarged and displayed according to the parking method to the target position, and the limited display area of the display device may be effectively utilized to present necessary information to the user in an easy-to-understand manner.

(3) The control device according to (2), in which the second range includes a third range including the front side and not including the rear side of the moving body in the top view image, and a fourth range including the rear side and not including the front side of the moving body in the top view image, and the control device is capable of switching the display range between the third range and the fourth range when the parallel parking is performed.

According to (3), when parallel parking is performed, the user may mainly confirm the circumstances at the front side of the moving body or mainly confirm the circumstances at the rear side of the moving body via the enlarged display of the top view image.

(4) The control device according to (3), in which, when the parallel parking is performed, the control device sequentially switches among a normal display in which the top view image is not enlarged, a front side enlarging display in which the display range is set to the third range, and a rear side enlarging display in which the display range is set to the fourth range each time a predetermined operation is performed by the user.

According to (4), by performing a predetermined operation, the user may cause the display device to display the desired display among the normal display, the front side enlarging display, and the rear side enlarging display, thereby presenting the user with information necessary for the user.

(5) The control device according to (4), in which the display device is a touch panel (touch panel 21), the operation is an operation on a button image (front portion display button BSf, rear portion display button BSr, whole body display button BSw) displayed on the touch panel, the control device causes the touch panel to display the button image (front portion display button BSf) including an image (image BSf1) showing a front portion of the moving body during the normal display, and switches from the normal display to the front side enlarging display in response to the button image being operated, the control device causes the touch panel to display the button image (rear portion display button BSr) including an image (image BSr1) showing a rear portion of the moving body during the front side enlarging display, and switches from the front side enlarging display to the rear side enlarging display in response to the button image being operated, and the control device causes the touch panel to display the button image (whole body display button BSw) including an image (image BSw1) showing the whole moving body during the rear side enlarging display, and switches from the rear side enlarging display to the normal display in response to the button image being operated.

According to (5), by using the button image for switching the display of the touch panel as the display device, the display to be switched to when the button image is operated may be suggested to the user, thereby improving the user convenience.

(6) The control device according to (4) or (5), in which the moving body is configured to be movable to the target position while being prevented from entering an entry prohibition place set by the user, and the control device is capable of switching between the front side enlarging display and the rear side enlarging display in accordance with an operation by the user when the entry prohibition place is set.

According to (6), the visibility of the top view image when the entry prohibition place is set may be improved, thereby making it easier to set the entry prohibition place and improving the user convenience.

(7) A moving body including the control device according to (1).

According to (7), the top view image obtained by viewing the moving body and the surroundings thereof from above may be appropriately enlarged and displayed according to the parking method to the target position, and the limited display area of the display device may be effectively utilized to present necessary information to the user in an easy-to-understand manner. Therefore, in addition to the user convenience, the operability of the moving body may be improved. It is also be possible to further improve traffic safety and contribute to development of a sustainable transportation system.

What is claimed is:

1. A control device for controlling a display device mounted on a moving body that moves to a target position specified by a user by automatic steering and that is configured to be capable of perpendicular parking into the target position and parallel parking into the target position, the control device comprising a processor configured to, when the perpendicular parking or the parallel parking is performed, before the moving body is moved by automatic steering, cause the display device to display a top view image of the moving body and surroundings of the moving body, and to display a frame image indicating a place set as the target position superimposed on the top view image such that a position of the target position can be adjusted by the user, enlarge and display the top view image according to an instruction from the user, and make a display range when the top view image with which the user can adjust the position of the target position is enlarged and displayed different between when the perpendicular parking is performed and when the parallel parking is performed.

2. The control device according to claim 1, wherein the processor is configured to set the display range to a first range when the perpendicular parking is performed, and sets the display range to a second range when the parallel parking is performed, the first range is a predetermined range including one of a left side and a right side of the moving body in the top view image, and the second range is a predetermined range including one of a front side and a rear side of the moving body in the top view image.

3. The control device according to claim 2, wherein the second range includes a third range including the front side and not including the rear side of the moving body in the top view image, and a fourth range including the rear side and not including the front side of the moving body in the top view image, and the processor is configured to switch the display range between the third range and the fourth range when the parallel parking is performed.

4. The control device according to claim 3, wherein, when the parallel parking is performed, the processor is configured to sequentially switch among a normal display in which the top view image is not enlarged, a front side enlarging display in which the display range is set to the third range, and a rear side enlarging display in which the display range is set to the fourth range each time a predetermined operation is performed by the user.

5. The control device according to claim 4, wherein the display device is a touch panel, the operation is an operation on a button image displayed on the touch panel, the processor is configured to cause the touch panel to display the button image including an image showing a front portion of the moving body during the normal display, and switch from the normal display to the front side enlarging display in response to the button image being operated, the processor is configured to cause the touch panel to display the button image including an image showing a rear portion of the moving body during the front side enlarging display, and switch from the front side enlarging display to the rear side enlarging display in response to the button image being operated, and the processor is configured to cause the touch panel to display the button image including an image showing an entirety of the moving body during the rear side enlarging display, and switch from the rear side enlarging display to the normal display in response to the button image being operated.

6. The control device according to claim 5, wherein the moving body is configured to be movable to the target position while being prevented from entering an entry prohibition place set by the user, and the processor is configured to switch between the front side enlarging display and the rear side enlarging display in accordance with an operation by the user when the entry prohibition place is set.

7. The control device according to claim 4, wherein the moving body is configured to be movable to the target position while being prevented from entering an entry prohibition place set by the user, and the processor is configured to switch between the front side enlarging display and the rear side enlarging display in accordance with an operation by the user when the entry prohibition place is set.

8. A moving body comprising the control device according to claim 1.

9. The control device according to claim 1, wherein the processor is configured to set the display range to a first range when the perpendicular parking is performed, and in a case where the frame image is positioned on one of a left side and a right side of the moving body in the top view image, the first range is a predetermined range including the one of the left side and the right side of the moving body in the top view image more than an other of the left side and the right side.

10. The control device according to claim 1, wherein the processor is configured to set the display range to a second range when the parallel parking is performed, and, in a case where the frame image is positioned on one of a left side and a right side of the moving body in the top view image, the second range is a predetermined range including the one of the left side and the right side of the moving body and one of a front side and a rear side of the moving body in the top view image.

11. The control device according to claim 10, wherein the processor is configured to set the second range such that the second range includes a fourth range including the rear side of the moving body in the top view image by excluding an upper side of the frame image from the display range of the display device.

12. A control device for controlling a display device mounted on a moving body that moves to a target position specified by a user by automatic steering and that is configured to be capable of perpendicular parking into the target position and parallel parking into the target position, the control device comprising a processor configured to:

when the perpendicular parking or the parallel parking is performed, cause the display device to display a top view image of the moving body and surroundings of the moving body, and to display a frame image indicating a place set as the target position superimposed on the top view image;

enlarge and display the top view image according to an instruction from the user; and make a display range when the top view image is enlarged and displayed different between when the perpendicular parking is performed and when the parallel parking is performed, wherein when the parallel parking is performed, the processor is configured to sequentially switch among a normal display in which the top view image is not enlarged, a front side enlarging display in which a front side of the moving body is included and a rear side of the moving body is not included in the top view image, and a rear side enlarging display in which the rear side of the moving body is included and the front side of the moving body is not included in the top view image, the display device is a touch panel, a button image is displayed on the touch panel, the processor is configured to cause the touch panel to display the button image including an image showing a front portion of the moving body during the normal display, and switch from the normal display to the front side enlarging display in response to the button image being operated, the processor is configured to cause the touch panel to display the button image including an image showing a rear portion of the moving body during the front side enlarging display, and switch from the front side enlarging display to the rear side enlarging display in response to the button image being operated, and the processor is configured to cause the touch panel to display the button image including an image showing an entirety of the moving body during the rear side enlarging display, and switch from the rear side enlarging display to the normal display in response to the button image being operated.

* * * * *